Nov. 24, 1931.     H. H. CUTLER     1,833,017
ELECTRIC TRAIN CONTROL FOR GAS ENGINE PROPULSION
Filed June 7, 1928     2 Sheets-Sheet 2
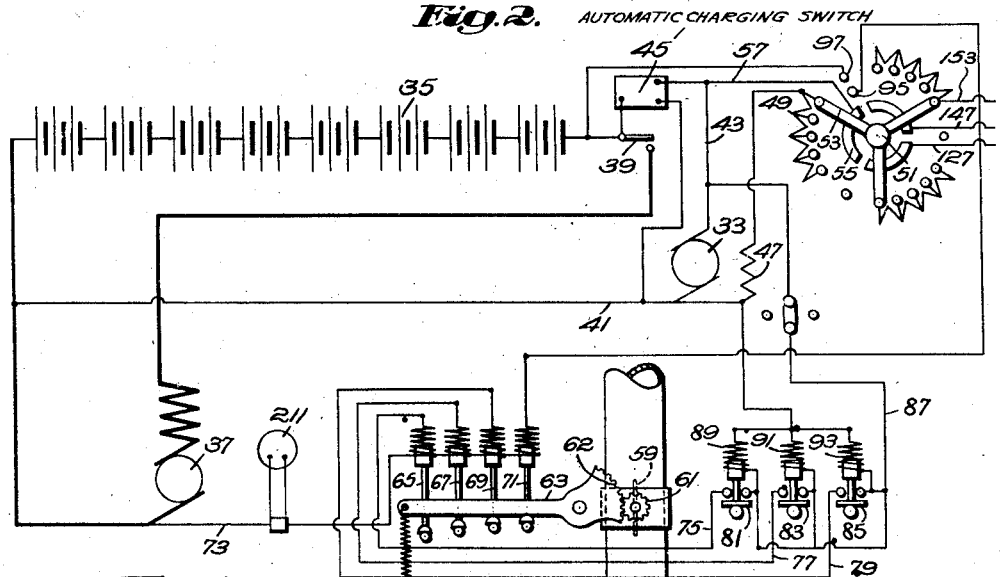
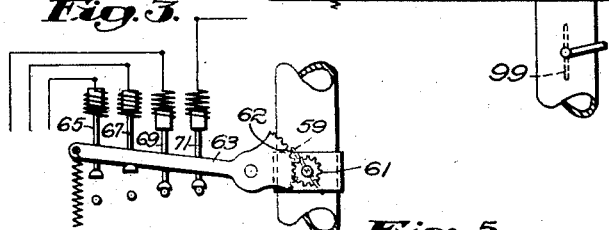
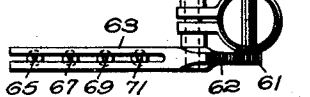
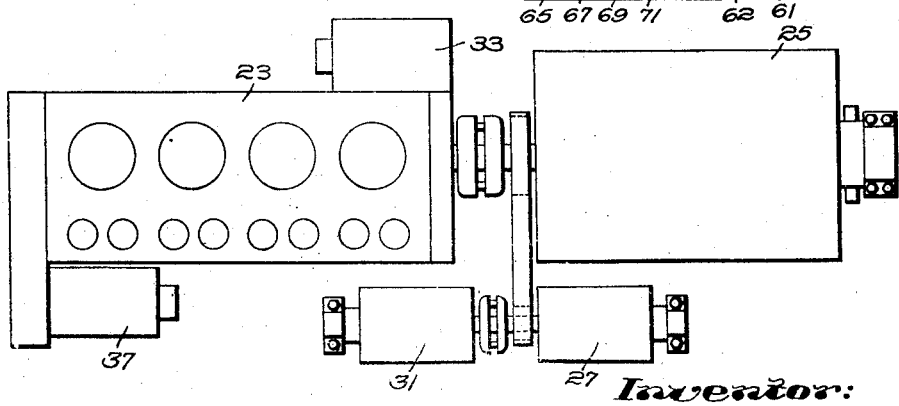
Inventor:
Henry H. Cutler
by Emery, Booth, Janney & Varney Attys.

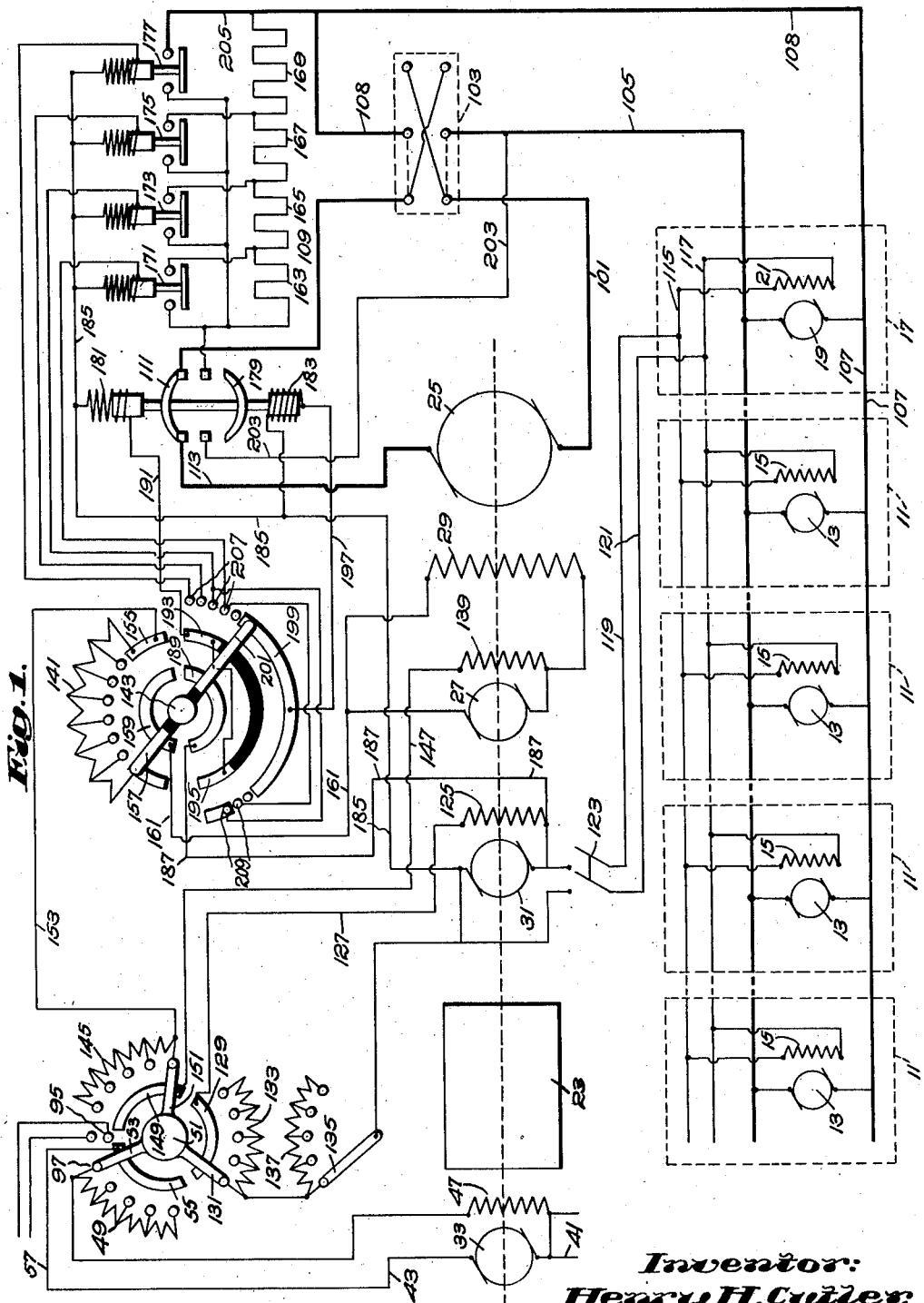

Patented Nov. 24, 1931

1,833,017

UNITED STATES PATENT OFFICE

HENRY H. CUTLER, OF BROOKLINE, MASSACHUSETTS

ELECTRIC TRAIN CONTROL FOR GAS ENGINE PROPULSION

Application filed June 7, 1928. Serial No. 283,654.

This invention relates to systems of electric propulsion and control for self propelled vehicles, being especially adapted for the control of a train employing an internal combustion engine as a source of power for driving a generator, the latter furnishing current for the propulsion of individual, motor-equipped units composing the train.

In the illustrated embodiment of the invention, the latter is shown applied to the propulsion and control of a train composed of a plurality of units, each driven by its own electric motor, and each coupled to a cab or pilot unit, also equipped with its own propelling motor, the cab being utilized to carry the engine, the generator for furnishing current to all the propelling motors of the train, and all the various controlling and current changing devices for starting and controlling the internal combustion engine and for starting, stopping and accelerating the train.

The invention will be best understood by reference to the following description when taken in connection with the accompanying illustration of one specific embodiment thereof, while its scope will be more particularly pointed out in the appended claims.

In the drawings:

Fig. 1 shows in diagrammatic form the circuiting arrangement for the control and propulsion of a train embodying one exemplification of the invention, the train being composed of a plurality of motor-equipped units coupled to a self-propelled pilot unit, showing also the main generator and other dynamo electric machines driven by the internal combustion engine with controlling devices therefor, the controlling devices for starting and controlling the gas engine being omitted in part from the diagrammatic showing of Fig. 1;

Fig. 2 is a diagrammatic representation of the starting and controlling devices for the internal combustion engine;

Fig. 3 shows the throttle control lever in a position approximating that corresponding to normal speed conditions in the engine;

Fig. 4 is a detail in plan showing the throttle control; and

Fig. 5 is a diagrammatic plan view showing the relation of the gas engine to the several electrical units associated therewith.

Referring to the drawings and to the exemplification of the invention therein illustrated, the same is shown as applied to the propulsion and control of a train comprising a plurality of diagrammatically designated train units 11 (Fig. 1) each equipped with its electrical propelling motor 13 of the direct current type and having a separately excited field winding 15. Coupled to the train units 11 is a control cab or pilot unit, diagrammatically represented at 17, equipped with its propelling motor 19 having its separately excited field winding 21, the cab carrying the controlling devices and various power units, shown in the upper part of Fig. 1 and in Fig. 2.

These power units comprise the internal combustion engine 23 and a plurality of associated dynamo electric machines, including the large generator 25 for supplying current to the armatures of the propelling motors 13 and 19, the smaller shunt wound generator 27 for exciting the field winding 29 of the main generator 25, the shunt wound generator 31 for exciting the field windings 15 and 21 of the propelling motors, and the generator 33 through which control, as hereinafter described, is exercised over the engine 23 and by which the storage battery 35 (Fig. 2) is charged, each of said generators being directly connected to the engine and driven thereby.

Referring first to the engine and to the devices for starting and controlling it, there is indicated (Fig. 5) a conventional type of internal combustion engine employing liquid hydrocarbon fuel fired by spark plugs and controlled by a valve in the intake manifold. The invention, however, is broadly applicable to Diesel engines and other engines of widely varying types.

The engine 23 is preferably equipped with self-starting devices (Fig. 2), which are herein shown of customary conventional form, including the storage battery 35 connected to energize a series-wound, starting motor 37 on the actuation of the starting switch 39, the starting motor being connected to turn the fly wheel of the engine through usual starting gearing, as, for example, a drive pinion of the Bendix type.

During the operation of the engine, the storage battery is replenished by current supplied from the charging generator 33 through conductors 41 and 43, the latter having in circuit an automatic switch 45 of conventional type adapted to respond to variations in potential difference between the battery and the charger automatically to close or open the charging circuit as may be required.

The engine at its maximum speed is capable of developing sufficient power to carry the heaviest load which the propelling motors will be called upon to assume, but is preferably provided with automatic governing means tending to maintain the engine at a speed, which, for purposes of designation, will be herein termed normal speed, and is substantially less than its maximum speed, being, for example, a speed sufficient to develop the power required for meeting normal load conditions which prevail during the greater part of the operations of the train, such as the propulsion of the train upon a substantially level trackway or on moderate grades. This normal speed, by way of example merely, might be half that of the maximum speed. Coupled with the governing means, however, are devices within the manual control of the pilot or engineer by which the speed of the engine and its power output may be temporarily increased by stages up to a maximum so as to meet the requirements of temporary overload, such as are incidental to the starting of the train from rest, its acceleration, or the climbing of heavy grades.

Since the maximum power from the engine is required only on starting, accelerating and climbing grades and a part only of its maximum power is called for under normal running conditions, the normal operation of the engine at a speed substantially less than maximum, but sufficient to meet light load conditions, avoids the wastage of power and the wear and tear on the connected machinery which would follow if the engine and its connected equipment were normally maintained at the speed necessary to meet maximum power conditions.

While other speed governing means for the engine might be employed, herein its fuel supply is automatically controlled to maintain normally a substantially constant speed by utilizing the variations in potential of one of the direct connected generators to close the throttle as the engine speed and generator potential tend to rise above normal and to open the same when the speed and potential tend to drop below normal.

In the illustrated embodiment of the invention, variations in the potential of the shunt wound charging generator 33 are employed for this purpose. To enable the pilot to vary the potential of the generator 33, however, to increase the engine speed at will, the shunt winding 47 of the generator is connected in series with a variable resistance 49 forming part of the rheostat 51. The field circuit extends from the field winding 47 to the rheostat 49 and then through the rheostat bridging arm 53, segment 55 and conductors 57 and 43 to the armature of the generator.

During the operation of the engine the speed is controlled by means of a butterfly valve 59 located in the engine manifold and adapted to be turned to various positions between full open position and full closed position by any suitable means, such as the pinion 61 meshing with a gear segment 62, the latter connected to the throttle lever arm 63.

The latter is operatively related to a series of solenoid-controlled actuators 65, 67, 69 and 71 comprising each a rod connected to a solenoid magnet and extending down between the two branches of the forked lever arm 63 and provided each with a lifting head underlying the lever. Each actuator has a relatively short movement of substantially the same extent, but they are so positioned in relation to the lever arm 71 by graded steps and with a slightly increasing amount of lost motion that individually they impart different angular movements to the throttle valve.

When all four actuators are deenergized they drop to their lowermost positions (as indicated in Fig. 2), and, having no effect on the valve, the latter is moved to its full open position by spring or gravity actuating means. If the actuator 65 alone is energized, the latter is lifted and, acting on the outer end of the lever arm, the valve is given a slight closing movement. If the next actuator 67 is energized it lifts the lever still further (as shown in Fig. 3), due to the fact that it engages the lever nearer its fulcrum point, and with a slightly lesser lost motion than in the case of the actuator 65, and the valve is further closed, while the energization of the actuator 69 still further reduces the fuel supply. The energization of the actuator 71 effects the greatest closing movement of the valve, this position of the valve being utilized, as will appear, when it is required to idle the engine, while the actuators 65, 67 and 69 are utilized in the control of the engine speed during the operation of the train.

Referring to the connections for the solenoid windings 65, 67 and 69, one terminal of each solenoid is connected to the common conductor 73 which leads to one pole of the generator and battery, while their opposite terminals are connected respectively by conductors 75, 77 and 79 to contacts at the respective bridging switches 81, 83 and 85, through which they may be individually connected to the common return conductor 87 leading to the opposite pole of the generator and battery.

The bridging switches 81, 83 and 85 are separately and independently controlled by the respective solenoid windings 89, 91 and 93 which are connected in parallel between the two terminals of the charging generator 33, so that they are subject to its varying potential. These coils, however, are wound to actuate their respective bridging switches at different generator potentials, the coil 93 requiring a somewhat higher potential to actuate its switch than the coil 91, and the coil 91 a somewhat higher potential than the coil 89.

In the operation of the apparatus the parts are so designed that, with the rheostat 51 in the position shown in Fig. 2, which represents the normal running position, and with the resistance 49 thereby cut out of the circuit of the field winding, the potential impressed by the generator 33 on the solenoid windings 89, 91 and 93 is sufficient to maintain the throttle valve intermediate the extreme positions to which it may be moved by the actuators and in a position insuring the supply of fuel required to maintain that normal speed.

This intermediate position, by way of example, might be that corresponding to the energization of the windings 89 and 91 and the actuation of the lifters 65 and 67 (as indicated in Fig. 3). If, due to ordinary variations in load, the speed of the engine tends to increase, the potential of the generator also increases and finally energizes the winding 93, lifting the actuator 69, and reducing the fuel supply and the engine speed until normal conditions are restored. If the engine speed drops below normal, the drop in generator potential deenergizes the winding 91 and drops the actuator 67, opening the valve to increase the fuel supply above its normal amount and bringing the engine speed back again to normal speed.

While, for the purposes of illustration, there are shown three solenoid actuators providing for four positions of the throttle valve (including its full open position with all actuators deenergized), the number of such actuators may be increased to provide any required number of steps in the movement of the throttle valve. By this means the engine speed is maintained substantially constant and capable of meeting moderate loads, such as encountered during the normal operation of the train. By using a plurality of relay controlled magnetic actuators, such as 65, 67, etc., a delicate graded control may be applied to a speed control member of the engine requiring the application of substantial power, such, for example, as the governor rod of a Diesel engine.

In the event of heavy overload, which will be encountered in starting, accelerating and climbing grades, and where the engine is required to develop a greater speed or a greater power, means are provided to enable the pilot manually to control the governing devices to open the throttle beyond the point fixed by the normal operation of the governing device.

This result is secured by manipulating the rheostat 51 to cut more or less resistance into the shunt field winding 47. This reduces the voltage impressed on the solenoid windings 89, 91 and 93 for any given engine and generator speed, deenergizing one or more of the actuators and further opening the throttle valve to give the required increased output. By cutting in a sufficient proportion of the resistance 49, the field of the charger 33 may be so weakened that under the maximum engine speed all the actuators will be deenergized and the throttle maintained wide open.

To idle the engine, the speed controlling rheostat 55 is moved to bridge the rheostat contacts 95 and 97, connecting the idling solenoid actuator 71 across the battery terminals, thereby almost, but not quite, closing the engine throttle valve.

The engine is initially started with the rheostat in the normal running position shown in Fig. 2 by pressing down on the starting switch 39, an auxiliary, hand-operated, throttle valve 99 being employed for the purpose of starting. As soon as the engine has been brought up to normal speed, the hand throttle valve 99 is opened and left in its wide open position, and the speed of the engine is thereafter controlled automatically through the electric governing device and the throttle valve 59 actuated thereby.

Referring now to the train controlling devices shown in Fig. 1, the main generator 25 is of sufficient size to supply the necessary current to the armatures of the propelling motors under all conditions, including that of a maximum load. The current from one pole of the generator passes through the conductor 101 to one terminal of the double pole reversing switch 103, thence through the main supply cable 105 running the length of the train, through the motor armatures in parallel and back through the track rail 107 and conductor 108 to the switch 103, and thence back to the opposite pole of the generator through the conductor 109, the normally closed solenoid-actuated switch 111 and conductor 113. The reversing switch enables the pilot at will to reverse the current through the motor armatures and run the train forwards or backwards at will, or to disconnect the motor armatures from the source of current supply.

The propelling motors are preferably designed to operate under all load conditions at full field strength so as to maintain their maximum efficiency. To this end their field windings are supplied with current from a source of potential which may be maintained substantially constant under all changes in engine and train speed and thereby within the limits of efficient field excitation.

Herein the fields of all the driving motors are supplied with current in a constant direction through two cables 115 and 117 extending lengthwise of the train, between which cables the field windings 15 and 21 are connected in parallel. These cables are connected to opposite poles of the exciter generator 31 through the conductors 119 and 121 and the switch 123.

Since temporary overload conditions call for occasional increase in engine speed, as already described, and this in turn will increase the speed of the exciter 31, means are provided to reduce the field strength of the exciter on increase in engine speed so as to maintain its potential and the field exciting current of the propelling motors substantially constant and at the most efficient point for all variations in engine speed called for by varying load conditions. With this, however, there is also provided means for weakening the voltage of the exciter under normal engine speed so that the fields of all the propelling motors may be weakened and the motors caused to run faster when high speeds under light load conditions are desired.

For this purpose the shunt field winding 125 of the exciter is connected by the conductor 127 to the segment 129 of the rheostat 51, so that, as the pilot turns the rheostat back to increase the engine speed on extreme overloads, as previously described, by means of the bridging arm 131 more or less resistance 133 may be introduced into the field winding. This serves to reduce the field strength of the exciter in proportion to the resulting increase in engine speed and to maintain the potential of the exciter substantially constant under such conditions.

The fields of all three of the small generators 27, 31 and 33 are preferably wound so as to develop full field strength at the normal speed of the engine, and the rheostat 51 provides means whereby increase in engine speed above normal prevents the field voltage of these generators from exceeding the designed standard.

Independently of the rheostat 51, and during the time the engine is running under normal speed, the field of the exciter 31 and the potential of the latter may be weakened to speed up the propelling motors by means of a second rheostat 135 controlling a resistance 137, also included in the circuit of the field winding 125 between the rheostat 51 and the remaining pole of the exciter. In normal operation the position of the rheostat is that shown in Fig. 1 in which the resistance 137 is cut out of circuit. When it is desired to speed up the motors under light load conditions, the rheostat 135 is turned to increase the resistance of the shunt field winding, weakening the potential of the exciter and weakening the fields of all the propelling motors.

Since the fields of the propelling motors are maintained substantially constant under load conditions, the torque developed by the motors and the speed of the train depend on the voltage and current supplied by the main generator 25. This is controlled not only by varying the speed of the engine, as previously described, but by varying the strength of the generator field winding 29. The latter in turn is controlled by varying the potential of the engine-driven, shunt-wound, generator exciter 27 which is connected directly in shunt to the field winding 29 of the main generator. To control the potential of the generator exciter 27 the current strength in its field winding 139 is varied, this being accomplished by means of a variable resistance 141 at the main controller 143 and by means of a resistance 145 forming a part of the previously mentioned rheostat 51.

For this purpose one terminal of the exciter field winding 139 is connected by the conductor 147 to the segment 149 of the rheostat 51 and thence through the bridging arm 151 to the variable resistance 145. Thence the circuit extends through the conductor 153 to the segment 155 constituting one terminal of the resistance 141, the resistance being controlled by the bridging arm 157 contacting with the segment 159 connected by the conductor 161 to one pole of the generator 27, the opposite pole being connected to the remaining terminal of the shunt winding 139.

To develop increased output in the main generator 25, the controller 143 is turned in a clockwise direction to cut out by successive stages the resistance 141 from the field circuit of the exciter 27, thereby increasing the potential of the exciter and increasing the current passing through the generator field winding. The full field strength for the exciter is preferably developed under normal engine speed conditions when all of the resistance 141 is cut out of its field circuit.

To prevent a further increase in the field current through the exciter winding 139 when the engine speed is increased above its normal speed by the manipulation of the rheostat 51 to meet temporary conditions of heavy overload, and to continue to maintain the operation of the exciter under conditions of highest efficiency, the variable resistance 145 is utilized. As the pilot turns the rheostat 51 back to increase the engine speed, the resultant increase in the speed of the exciter 27 and resultant increase in its potential will in itself increase the field strength and output of the generator 25. The simultaneous introduction by successive stages of the resistance 145, however, will proportionately offset the effect of the resultant increased exciter potential on its own field current and prevent the latter from exceeding its designed maximum value.

In the operation of the described system of train control and propulsion, with the train under way and running under headway and under normal load conditions, as, for example, over a substantially level trackway, the engine control rheostat 51 is set in the position represented in Fig. 1, under which conditions the engine tends to maintain its normal speed which, as previously stated, is substantially less than the maximum attainable speed. Ordinary acceleration or retardation of the train is then controlled by manipulating the main control lever 143 to cut in or out of the exciter field circuit 139 more or less of the resistance 141, thereby varying the strength of the generator field and its voltage and current and the torque and speed of the propelling motors. Under these conditions the engine speed will remain substantially constant at its normal rate, the electrical governing device being adequate within reasonably wide limits of load variations on the generator to maintain the engine speed substantially constant.

If, under light load conditions and with the resistance 141 cut into the field circuit 139, it is desired still further to accelerate the train, the controller 135 may be manipulated to weaken the fields of the propelling motors by cutting into the field circuit thereof through graduated steps the resistance 137.

When conditions of overload are to be met which require more than the normal speed of the engine to develop an increased or the full power output by the latter, as, for example, in starting the train from rest, climbing heavy grades, accelerating the train on grades or on the level, the speed of the engine may be increased by turning back the rheostat 51 counter-clockwise, cutting in more or less of the governing resistance 49 and proportionately opening the throttle valve 59. This proportionately increases the speed of the main generator armature 25 and the speed of the generator exciter 27 and thereby the field current and field strength of the main generator, proportionately increasing the current and voltage of the main generator and the torque of the propelling motors.

Supplemental control may at the same time be exercised over the main generator field by moving the main controller to cut out or cut in more or less of the resistance 141 from the exciter field 139, the maximum power being developed from the internal combustion engine and from the generator when all of the resistance 141 is cut out of the circuit of the field 139 and all of the resistance 49 cut into the field circuit of the charger 33. The main generator under these conditions is being driven at the maximum speed of the engine, with the throttle valve wide open, and with its field strength at the maximum.

As previously described, the manipulation of the engine control rheostat 51 to increase the engine speed simultaneously increases the resistance in the field of both the exciters 27 and 31. The field windings 139 and 125 for the two exciters are preferably designed to develop their full effective strength at the normal speed of the engine, so that by this means the field current is limited to its most effective maximum value under all conditions of variable engine speed.

It will be seen that the exciter 31 for the propelling motors provides a source of independent electro-motive force for the excitation of their fields which is kept within the maximum value for which the field windings are designed, although, as previously described, it may be reduced below this amount to weaken the fields by means of the controller 135 to speed up the motors under light load conditions.

To stop the train or to check its momentum when running at high speeds, there are preferably employed dynamic braking devices, providing means whereby the main generator 25 may be disconnected at will from the propelling motors and the armatures of the latter short-circuited through one or more of a series or bank of resistances 163, 165, 167 and 169, these being controlled respectively by solenoid actuated switches 171, 173, 175 and 177 through the main controller 143.

For the purpose of opening the generator circuit and simultaneously short-circuiting the propeller motor armatures, there is provided the switch 179 connected to the switch 111 and adapted to be moved to open circuit position when the latter is closed and to closed circuit position when the latter is open. The switches 111 and 179 are controlled jointly by the action of the solenoid windings 181 and 183. When the winding 183 is energized the switch 111 is closed and the switch 179 opened (as indicated in Fig. 1). When the winding 181 is energized, the switch 111 is opened and the switch 179 closed.

The solenoids 181 and 183 are connected through the controller 143 to any suitable source of electro-motive force for which there is herein utilized the motor exciter 31, one pole of which is connected by the conductor 185 to one terminal of each of the solenoids and the opposite pole by the conductor 187 to the controller segment 189. The remaining terminal of the solenoid winding 181 is connected by the conductor 191 to the two separately positioned controller segments 193 and 195, while the remaining terminal of the solenoid 183 is connected by the conductor 197 to the separate controller segment 199 occupying an angular position between the segments 193 and 195.

The controller 143 is provided with a bridging arm 201 movable with the bridging arm 157 to engage the segment 189. In its middle range of movement, corresponding to the several positions occupied by the bridging arm 157 in controlling the resistance 141, it overlies and engages the segment 199, so that within such range the circuit is closed through the solenoid 183, maintaining the switch 111 closed and the switch 179 open, the circuit through the solenoid 181 being open.

In extreme positions of the controller 143, the bridging arm 201 passes off from the segment 199 and into contact with the segment 193 or 195, as the case may be, energizing the solenoid 181 and deenergizing the solenoid 183, thereby opening the switch 111 and closing the switch 179. The closing of the switch 179 connects the motor supply main 105 through the conductor 203 with one end of the resistance bank, the opposite end being connected to the track connection 108 through the conductor 205.

The several switches 171 to 177 serve, when actuated through the controller 143, to cut out one or more of the resistance sections from the bank. One terminal of the winding of each of the switch solenoids is connected to the conductor 185, the opposite terminal of the several coils being connected respectively to the separate members of the series of contacts 207 on the controller 143 and located beyond the segment 199. As the controller is moved counter-clockwise to cause the bridging arm 201 to leave the segment 199 and pass on to the segment 193, it may be brought into successive engagement with the contacts 207 to actuate the resistance switches one after another as may be required to cut out one or more of the resistance sections.

One or more of the contacts 207, as, for example, those connected to the solenoid windings for switches 171 and 173, are cross-connected on the controller respectively to corresponding contacts 209 located beyond the opposite end of the segment 199. Accordingly, when the controller is moved in a clockwise direction to cause the bridging arm 201 to leave the opposite end of the segment 199 and pass on to the segment 195, it may be brought into a position to actuate the switch 171 and subsequently to actuate the switch 173.

The operation of the dynamic braking devices, in conjunction with the other features of train control, are as follows:

When the train is running at high speed under a light load, the controller will have been moved to its high speed position to cut out all or substantially all of the resistance 141, and the bridging arm 201 will be positioned at or near the end (left-hand end as viewed in Fig. 1) of the controller segment 199. If the train then encounters a down grade while running at speed, the load will soon become negative, or, in other words, the train will tend to run away, causing the propelling motors to act as generators, returning current to the main generator, which in turn will act as a motor to drive the engine, and the entire equipment may assume an excessive and dangerous speed. Moving the main controller back counter-clockwise to cut resistance into the field winding 139, reducing the electro-motive force of the generator 25, would only aggravate this situation.

This condition, which will be accompanied by a reversal of current in the main generator circuit, and may be indicated to the pilot by an ammeter therein, can be met by moving the main controller still further toward the high speed position, that is, still further clockwise. This causes the bridging arm to close the switch 179 and open the switch 111, disconnecting the generator and connecting the propelling motors through the entire series of resistances. The current produced by the driving motors is then absorbed in the bank of resistances. If this movement does not sufficiently check the speed of the train, the controller may be moved to its next position to cause the bridging arm to engage one of the contacts 209 to lift the switch 171, cutting out the resistance 163, and if a still further check is required on the speed of the train, the controller may be moved still further to cut out the resistance 165.

As soon as the train slows down, the controller may then be moved back to full speed position, reconnecting the generator to the motors and returning full voltage to the main train cable 105. This change of movement of the controller may be effected at any time to check the speed of the train with little or no sparkling at the solenoid switch contacts and without imparting jerks or shocks to the train movement.

To stop the train when operating under a load, the master controller is moved back in a counter-clockwise direction to gradually cut in the resistance 141 and reduce the voltage on the main train cable, the controller being then turned still further in the same direction, causing the bridging arm 201 to contact with the segment 193 to open the switch 111 and close the switch 179, thereby connecting the propelling motor armatures through the resistance bank. This may be followed by a still further movement of the controller lever to engage the contacts 207 in succession, which actuates one by one the resistance switches 171 to 177, cutting out one by one the resistances 163 to 169, until a dead, short circuit is created across the armatures of the propelling motors, thus holding all the armatures of these motors firmly at rest with their field magnets kept fully energized. By this movement of the controller the train is brought gradually to a stop without the use of air brakes or other mechanical brakes to stop the train or check its speed, although such brakes may be employed for emergency purposes to supplement the dynamic braking apparatus.

All necessary protective devices usual in this class of apparatus, such as fuses and overload switches, may be employed, and the cab or pilot unit is preferably equipped with an instrument board (not shown) which carries all necessary instruments indicating the conditions of the various operating units of the system, including, among others, a speed indicator for the engine, an ammeter for showing current conditions in the main generator circuit, a volt meter for indicating the voltage of the motor field exciter, and an ammeter or other instrument associated with the solenoids for controlling the throttle valve to indicate the position thereof. For the latter purpose there is shown in Fig. 2 the ammeter 211.

It will be observed that all switches and controls, including solenoids, relays and other circuit changing devices, are located in the cab or pilot unit, the control of the driving motor requiring no change in connections at the motors themselves, thereby adding greatly to the simplicity of the installation and the smooth working of the apparatus. It will also be observed that the described arrangement permits the operation of all the electrical units at their maximum efficiency during the major part of the train operation, the propelling motors and the three small generators being operated under a substantially constant field potential, which may be fixed at the point designed to develop full field strength.

It will also be seen that this system provides a smooth, flexible means for control of the gas engine and the main generator and a simple control for the propelling motors under widely varying conditions of load and speed, including conditions of negative load.

While I have herein shown for the purposes of illustration one specific embodiment of the invention, it is to be understood that extensive deviations may be made from the form and relative arrangement of parts shown and from the described form of circuiting, all without departing from the spirit thereof.

Claims:

1. In a system of vehicle propulsion and control, the combination with an internal combustion engine, speed-responsive, fuel-supply, governing means automatically to maintain the engine normally at a substantially constant speed, means for manually controlling the fuel supply to increase the same beyond the point fixed by the governing means, a propelling motor having an armature and a separately excited field winding, a main generator driven by the engine for supplying current to the motor armature, said generator having separately excited field winding, a generator exciter having a shunt-wound field circuit for supplying current to the field winding of the main generator, said generator exciter being also driven by the engine, manually controlled, variable resistance means for varying the field current of said generator exciter, a motor exciter having a shunt-wound field circuit for supplying current to the field winding of the motor also driven by the engine, a manually controlled, variable resistance in the field circuit of the motor exciter, and variable resistances in the field circuits of both exciters controlled with said manual fuel supply controlling means for reducing the current therein when the fuel supply is increased by its manual control.

2. In a system of vehicle propulsion and control, the combination with an internal combustion engine, of governing means to automatically maintain the engine normally at a substantially constant speed, controlling means to increase the speed above the normally governed rate, a propelling motor having an armature and a separately excited field winding, a generator driven by the engine for supplying current to the motor armature, manual control means for varying the field strength of the generator, a motor exciter driven by the engine and adapted at normal engine speed to maintain the normal potential on the motor field winding sufficient to develop substantially full field strength, and means connected with said manual speed control means for regulating the potential of said motor exciter to prevent further increase on increase in engine speed.

3. In a system of vehicle propulsion and control, the combination with an internal combustion engine, of governing means to automatically maintain the engine normally at a substantially constant speed, controlling means to increase the speed above the normally governed rate, a propelling motor having an armature and a separately excited field winding, a source of current for the field winding of the propelling motor adapted to be maintained at substantially the same normal potential during variations in the engine speed, a generator driven by the engine for supplying current to the motor armature, and control means for varying the field strength of the generator.

4. In a system of vehicle propulsion and control, the combination with an internal combustion engine, of governing means to automatically maintain the engine normally at a substantially constant speed, controlling means to increase the speed above the normally governed rate, a main generator driven by the engine and having a separately excited field winding, a propelling motor, having an armature supplied with current from the main generator, said motor having a field winding supplied from a separate source of electro-motive force, a generator exciter having a shunt-wound field circuit driven by the engine for supplying current to the said field winding of the main generator, and variable resistance means in the shunt field circuit for varying the field strength of the exciter.

5. In a system of vehicle propulsion and control, the combination with an internal combustion engine, of governing means to automatically maintain the engine normally at a constant speed, controlling means to increase the speed above the normally governed rate, a main generator driven by the engine and having a separately excited field winding, a propelling motor, having an armature supplied with current from the main generator, said motor having a field winding supplied from a separate source of electro-motive force, a generator exciter driven by the engine for supplying current to the said field winding of the main generator, and means for controlling the field strength of the exciter.

6. In a system of vehicle propulsion and control, the combination with an internal combustion engine, of a generator driven thereby, means for varying the speed of the engine, a generator exciter driven by the engine, a propelling motor having a field winding and having an armature adapted to be supplied with current from the generator, a motor exciter driven by the engine for supplying current to the field winding of the motor, controlling means for controlling the potential of the generator exciter and one or more resistance sections, said means also including devices for connecting the motor armature to the generator or disconnecting the same therefrom and connecting it on short circuit or through one or more of said resistance sections.

7. In a system of vehicle propulsion and control, the combination with an internal combustion engine having a fuel supply control, of a generator driven thereby, governing means for automatically maintaining the operation of the engine normally at a substantially constant rate of speed, the same comprising electro-magnetic devices controlling the fuel supply of the engine and responsive to the potential of the generator to reduce the fuel supply on increase of potential following an increase in engine speed and to increase the fuel supply on decrease of potential following a decrease in engine speed, means for manually controlling the governing means to vary the engine speed from normal, the same comprising means independently to vary the potential of the generator, a main generator driven by the engine having a separately excited field winding, one or more propelling motors connected to the main generator, a generator exciter also driven by the engine for supplying current to the field winding of the main generator, said exciter having a field winding, manual controlling means for varying the potential of the generator exciter comprising a variable resistance in its field winding, and means connected to the manual control means for reducing the field strength of the exciter simultaneously with increased speed of the engine above normal.

8. In a system of vehicle propulsion and control, the combination with an internal combustion engine having a fuel supply control, of a generator driven by the engine, a propelling motor, a main generator for supplying current to the motor, a generator exciter driven by the engine, governing means for maintaining the engine normally at a substantially constant speed, the same comprising electro-magnetic devices controlling the fuel supply of the engine and responsive to the potential of the generator to reduce the fuel supply on increase of potential following an increase in engine speed and to increase the fuel supply on decrease of potential following a decrease of engine speed, means for controlling the governing means, the same comprising manual means for independently controlling the potential of the generator to vary the engine speed, and means connected with said manual means for simultaneously controlling the potential of the generator exciter.

9. In a system of vehicle propulsion and control, the combination with an internal combustion engine, of governing means to automatically control its fuel supply and maintain the engine normally at a substantially constant speed, manual controlling means to vary the fuel supply from said normally governed amount, a propelling motor, a main generator driven by the engine and supplying current to the propelling motor, an exciting generator also driven by the engine for supplying field current to the generator, said exciting generator having a field circuit means for varying the generator exciting current inversely with the speed changes of the engine due to the actuation of said manual engine speed controlling means and comprising a resistance in the field circuit of said exciting generator actuated with said manual controlling means, and additional controlling means for varying the field exciting current of said exciting generator comprising a separately actuated rheostat in its field circuit.

10. In a system of vehicle propulsion and control, the combination with an internal combustion engine, of governing means automatically to maintain the engine normally at a substantially constant speed, controlling means to vary the speed from the normally governed rate, a main generator having an armature driven by the engine, a field winding for said generator, an exciter generator driven by the engine for supplying current to the main generator field winding, means associated with said controlling means for varying the field strength of said exciter generator simultaneously with variations in engine speed, and additional means for controlling the field strength of said exciter generator independently of said engine speed controlling means.

11. In a system of vehicle propulsion and control, the combination with an internal combustion engine, of fuel supply governing means automatically to maintain the engine normally at a substantially constant speed, manual controlling means to vary the speed from the normally governed rate, a main generator driven by the engine having a separately excited field winding, a propelling motor connected to the main generator, an exciter generator driven by the engine for exciting the generator field winding, a field winding for the exciter generator and means associated with said engine speed controlling means to simultaneously control the current through the field winding of said exciter generator.

12. In a system of vehicle propulsion and control, the combination with an internal combustion engine, of governing means automatically to maintain the engine normally at a substantially constant speed, controlling means to vary the speed from the normally governed rate, a main generator driven by the engine having normally a substantially constant field strength under the varying speeds of the engine, and additional control means for controlling the field strength of said main generator to vary its output at will.

13. In a system of vehicle propulsion and control, the combination with an internal combustion engine, of governing means to automatically maintain the engine normally at a substantially constant speed, controlling means to vary the speed from the normally governed rate, a propelling motor, a main generator for supplying current to the motor, said generator having a field winding, an exciting generator for the generator field winding also driven by said engine, means associated with said engine speed varying means for inversely varying the exciting current for the main generator field winding during speed variations, and means independent of said engine speed varying means to control said exciting generator to vary the output of said main generator.

14. In a system of vehicle propulsion and control, the combination with an internal combustion engine, of a generator driven thereby, means for varying the speed of the engine, a generator exciter driven by the engine, a propelling motor supplied with current from the generator, and controlling means for controlling the field current of said generator comprising a rheostat having one or more resistance sections and connections at either end of its range of movement for disconnecting the motor from the generator and connecting it on short circuit through one or more of said resistance sections.

15. In a system of vehicle propulsion and control, the combination with an internal combustion engine, of speed responsive fuel supply governing means automatically to maintain the engine normally at a substantially constant speed, means for manually controlling the fuel supply to increase the same beyond the point fixed by the governing means, a propelling motor having an armature and a separately excited field winding, a separately excited generator driven by the engine and supplying current to the motor armature, a generator exciter driven by the engine, control means for varying the potential of the generator exciter, a motor exciter driven by the engine and adapted at normal engine speed to maintain a normal potential on the motor field winding sufficient to develop substantially full speed strength, and means connected with said manual fuel supply controlling means for regulating the potential of said motor exciter to prevent further substantial increase on increase in engine speed.

16. In a system of vehicle propulsion and control, the combination with an internal combustion engine, of governing means automatically to maintain the engine normally at a substantially constant speed, controlling means to increase the speed above the normally governed rate, a propelling motor having an armature and a separately excited field winding, a source of current for the field winding of the propelling motor adapted to be maintained at substantially the same normal potential during variations in the engine speed, controlling means for lowering the potential of the motor field current, and a generator driven by the engine for supplying current to the motor armature.

17. In a system of vehicle propulsion and control, the combination with an internal combustion engine, of controlling means to control the speed thereof, a propelling motor having an armature and a separately excited field winding, a generator driven by the engine for supplying current to the motor armature, a source of current for the field winding of the propelling motor with means for maintaining said current at substantially the same potential during variations in the engine speed, and control means for varying the output of said generator to said motor while maintaining the engine speed substantially constant.

13. In a system of vehicle propulsion and control, the combination with an internal combustion engine, of governing means automatically to maintain the engine normally at a substantially constant speed, controlling means for varying the speed from a normally governed rate, a generator driven by the engine, said generator having a field winding, means operatively connected to the controlling means for varying the generator field current inversely with changes in engine speed, a separately operable controller for varying the potential of the generator, and a propelling motor supplied with current from the generator.

In testimony whereof, I have signed my name to this specification.

HENRY H. CUTLER.